US008073694B2

(12) United States Patent
Davis et al.

(10) Patent No.: US 8,073,694 B2
(45) **Date of Patent: *Dec. 6, 2011**

(54) SYSTEM AND METHOD FOR TESTING A TTS VOICE

(75) Inventors: Steven Lawrence Davis, Madelia, MN (US); Shane Fetters, St. Peter, MN (US); David Eugene Schulz, Wauwatosa, WI (US); Beverly Gustafson, St. Peter, MN (US); Louise Loney, Elysian, MN (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/646,125

(22) Filed: Dec. 23, 2009

(65) Prior Publication Data

US 2010/0100385 A1 Apr. 22, 2010

Related U.S. Application Data

(63) Continuation of application No. 11/235,822, filed on Sep. 27, 2005, now Pat. No. 7,711,562.

(51) Int. Cl.
*G10L 13/00* (2006.01)
*G06F 17/27* (2006.01)

(52) U.S. Cl. ........................................... 704/258; 704/9

(58) Field of Classification Search ........................ None
See application file for complete search history.

(56) References Cited

U.S. PATENT DOCUMENTS

| | | | |
|---|---|---|---|
| 5,850,629 | A | 12/1998 | Holm et al. |
| 6,006,183 | A | 12/1999 | Lai et al. |
| 6,363,342 | B2 | 3/2002 | Shaw et al. |
| 6,697,780 | B1 | 2/2004 | Beutnagel et al. |
| 6,766,295 | B1 | 7/2004 | Murveit et al. |
| 6,829,581 | B2 | 12/2004 | Meron |
| 6,961,704 | B1 | 11/2005 | Phillips et al. |
| 6,988,069 | B2 | 1/2006 | Phillips |
| 6,990,449 | B2 | 1/2006 | Case |
| 6,990,451 | B2 | 1/2006 | Case et al. |
| 7,280,967 | B2 | 10/2007 | Gleason et al. |
| 7,334,183 | B2 | 2/2008 | Rusnak et al. |
| 7,472,066 | B2 | 12/2008 | Kuo et al. |
| 7,475,016 | B2 | 1/2009 | Smith et al. |
| 7,487,092 | B2 | 2/2009 | Gleason et al. |
| 2005/0027531 | A1 | 2/2005 | Gleason et al. |
| 2005/0096909 | A1 | 5/2005 | Bakis et al. |
| 2006/0095262 | A1 | 5/2006 | Danieli |
| 2007/0016421 | A1 | 1/2007 | Nurminen et al. |
| 2007/0055526 | A1 | 3/2007 | Eide et al. |

OTHER PUBLICATIONS

Dijkstra eta I., “Frisian TTS, an example of bootstrapping TTS for minority languages”, in SSW5-2004, 97-102, 2004.

*Primary Examiner* — Brian Albertalli

(57) ABSTRACT

Disclosed are various elements of a toolkit used for generating a TTS voice for use in a spoken dialog system. The invention in each case may be in the form of the system, a computer-readable medium or a method for generating the TTS voice. An embodiment of the invention relates to a method for preparing a text-to-speech (TTS) voice for testing and verification. The method comprises processing a TTS voice to be ready for testing, synthesizing words utilizing the TTS voice, presenting to a person a smallest possible subset that contains at least N instances of a group of units in the TTS voice, receiving information from the person associated with corrections needed to the TTS voice and making corrections to the TTS voice according to the received information.

15 Claims, 10 Drawing Sheets

300

302 VOICE TALENT/TTS VOICE Number 3
SENTENCE/UTTERANCE NO. 512

304

| WORKER | DATE DONE | PROGRESS | CHECKED OUT | STATUS |
|---|---|---|---|---|
| TMI | 1/3/04/05 | INITIAL ASR REVIEW | NO | DONE |
| DS | 09/04/05 | ALIGNMENT REVIEW | NO | DONE |
| SD | | TTS VOICE TEST | CHECK OUT | CURRENTLY ACTIVE |
| | | FINAL DEPLOYMENT | NO | NEXT TASK |
| | | | | |
| | | | | |

SYSTEM AND METHOD FOR TESTING A TTS VOICE

RELATED APPLICATIONS

The present application is a continuation of U.S. patent application Ser. No. 11/235,822, filed Sep. 27, 2005, now U.S. Pat. No. 7,711,562, which is part of a related group of applications including U.S. patent application Ser. No. 11/235,821, filed Sep. 27, 2005, now U.S. Pat. No. 7,742,921; U.S. patent application Ser. No. 11/235,817, filed Sep. 27, 2005, now U.S. Pat. No. 7,630,898; U.S. patent application Ser. No. 11/235,857, filed Sep. 27, 2005, now U.S. Pat. No. 7,742,919; U.S. patent application Ser. No. 11/235,954, filed Sep. 27, 2005, now U.S. Pat. No. 7,693,716. Each of these applications is incorporated herein by reference in their entirety.

BACKGROUND OF THE INVENTION

1. Field of the Invention

The present invention relates to spoken dialog system and more specifically to improvements within the process of building a text-to-speech voice.

2. Introduction

A dialog system may include a text-to-speech (TTS) voice which synthesizes a human voice as part of a natural language dialog. Building a TTS voice is a complicated and expensive process. Concatenative TTS Synthesis requires a database of at 250,000 to a million or more correctly labeled half phonemes. Each word consists of a sequence of phonemes that correspond to the pronunciation of the words. A phoneme is a speaker-independent and context-independent unit of meaningful sound contrast. Half phonemes may refer to a portion of a phoneme. The synthesis of a human voice generally involves receiving text to be "spoken", such as "how may I help you?" and analyzing and selecting the appropriate phonemes, concatenating them together, and then producing the associated audio that sounds like a human speaking the words.

Building a TTS voice also involves processing an audio file of words or sentences and labeling the file (manually or automatically). Labeling means determining and noting the start and stop point of each phoneme within the audio file. Since speech is a continuum, it is impossible for humans to label audio consistently. For many years, Automatic Speech Recognition (ASR) has been used to automatically label phonemes. This approach works fairly well, but ASR, even under ideal conditions, has an error rate of a few percent. There are many reasons for this error rate, but the biggest contributors is speaking errors by the people that speak and have their voices recorded to create the audio file, idiosyncratic pronunciations, and natural variation, both free and context sensitive.

An example of the context free variation is the optional articulation of word final /t/, as in "can't" versus "can'". An example of context sensitive variation is when word final /t/ becomes a "flap" when the following word starts with an unstressed vowel and the speaker is speaking in a conversational style. The crux of the problem for voice building is that even if ASR is 99% accurate, in a database of a million phonemes, there will be 10,000 errors. Using traditional methods of voice building, the inventors have seen that ASR accuracy is on the order of 95-99% accurate, so a voice database built by these methods has so many errors that the overall quality of the finished TTS voice is noticeably degraded. The key to high ASR accuracy is using good speaker dependent acoustic models, and a dictionary that contains all possible variant pronunciations of every word in the lexicon. Then, the ASR is given the exact text that is being read along with every possible variant of every word in the text.

A voice building project involves managing thousands of audio files, text files and dictionaries. Traditionally, a TTS voice is built from 3000-20000 audio and text files. Traditional toolsets are not integrated. A method is needed whereby more than one person can work on a TTS voice building project. As voice building progresses, each utterance goes through a series of states. Any change management system can track states, however there is no voice building toolkit which integrates change management in such a way that one can request the "next item that needs to be done" in such a way that several people can work in parallel.

No matter how good the alignment process is, there will be errors in the final database, and human testers must listen to TTS synthesis to find these errors. Traditionally, this testing was hit-or-miss, and involved listening to hundreds or even thousands of hours of synthesized speech. Accordingly, further improvements in the process of generating a TTS voice are needed.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention provides various elements of a toolkit used for generating a TTS voice for use in a spoken dialog system. Each related case incorporated above addresses a claim set directed to one of the features of the toolkit. The embodiments in each case may be in the form of the system, a computer-readable medium or a method for generating the TTS voice.

An embodiment of the invention relates to a method for preparing a text-to-speech (TTS) voice for testing and verification. The method comprises processing a TTS voice to be ready for testing, synthesizing words utilizing the TTS voice, presenting to a person a smallest possible subset that contains at least N instances of a group of units in the TTS voice, receiving information from the person associated with corrections needed to the TTS voice and making corrections to the TTS voice according to the received information.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
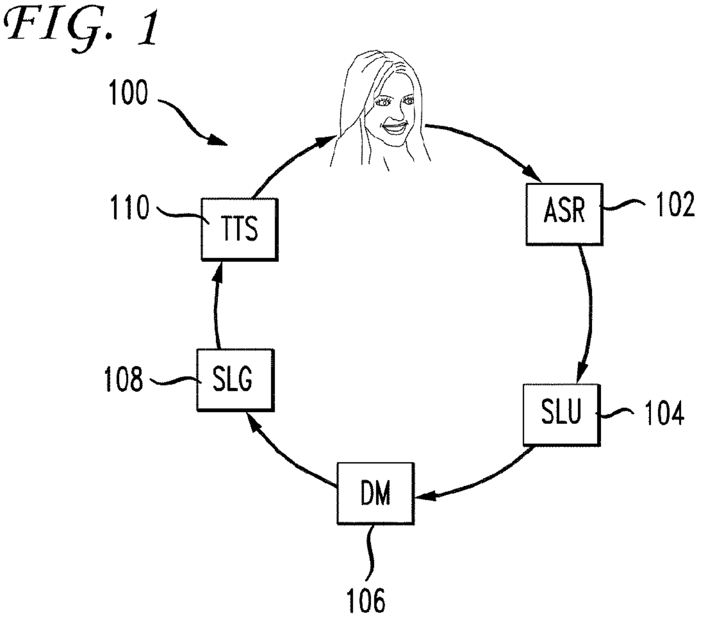
FIG. 1 illustrates an exemplary spoken dialog system.

Spoken dialog systems aim to identify intents of humans, expressed in natural language, and take actions accordingly, to satisfy their requests. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110. The present invention focuses on innovations related to generating a TTS voice that is utilized by the TTS module 110 to "speak" to a person interacting with the dialog system.

ASR module 102 may analyze speech input and may provide a transcription of the speech input as output SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

Figure 2:
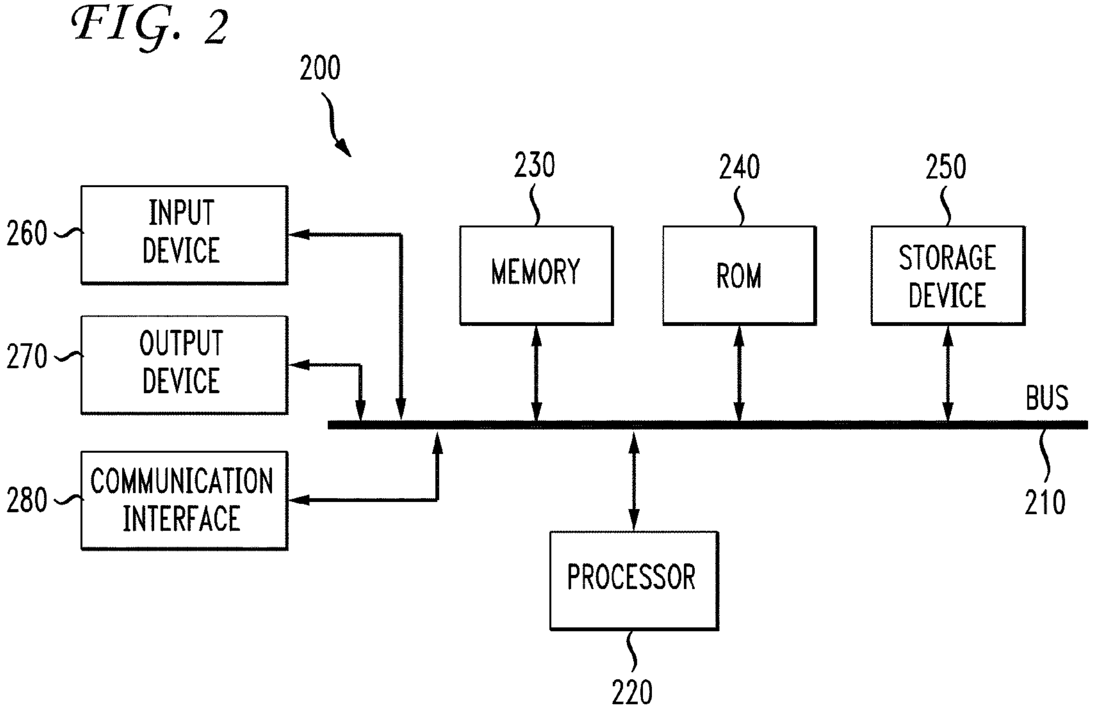
FIG. 2 illustrates an example computing device for use with the invention.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Where the inventions disclosed herein relate to the TTS voice, the output device may include a speaker that generates the audible sound representing the computer-synthesized speech.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, motion input, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200.

System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280. The system may be a compute device or the computing device may be a plurality of interconnected computing devices. The steps of the inventions set forth below may be programmed into computer modules that are configured and programmed to perform the specific operational step and to control the computing device to perform the particular step. Those of skill in the art will understand the various selection of programming languages that may be used for such modules.

As introduced above, the present invention relates generally to a toolkit for assisting researchers to study and generate a TTS voice for use in a spoken dialog system or any other application that can utilize a synthetic voice. Generating these voices is a very time consuming and technical process. The process generally includes recording many sentences read by a "voice talent" or a chosen person to read the prepared sentences. A researcher or worker will initially listen to the voice talent and follow the text to check for gross errors in reading, transposed words, unusual pronunciations and so forth. The text is to be matched with the recorded audio. The worker would correct the orthography to match what was really said. As an example, the voice talent would read 3,000 sentences so that 10-20 hours of reading could be recorded.

Once the sentence reading is completed, researchers can adjust the endpointing of the recording. Endpoints will define the boundaries to each sentence or utterance. In some cases, the voice talent may say "umm" or comment before reading a sentence. These comments and extra words can be cleaned up by truncating endpoints defining a sentence or a phrase. Once the researchers are content with the matching of the audio with the text and endpointing process, generating the voice next requires performing speech recognition on the recorded voice. This is typically a "forced" speech recognition where the system will tell the automatic speech recognition (ASR) module what sentence it will hear. ASR is typically performed one sentence at a time. The ASR module arrives at a phoneme stream with time offsets. For example, to find a particular phoneme in the database, it may be in sentence 512, time offset 50 ms to 53 ms. If the process of ASR and establishing the time offsets for each phoneme were perfect, then the TTS voice would be complete for synthesizing the voice talent. The result is a database where each phoneme (or half phoneme) is labeled with a start and stop time.

However, errors creep into the process that may affect the TTS voice. The TTS system will in performing speech synthesis select a particular phoneme (or in some cases select two half-phonemes), a pitch and a duration, and then go to the database to find the best match in a particular utterance or utterances. Problems may include picking the wrong phoneme, picking a phoneme where the alignment is off. For example, if the recorded time offset is 100 ms but it should be 105 ms. The ASR could have misrecognized the phoneme, as in the difference between saying "the" and "thee". The results could be that instead of synthesizing the word "stuff", it would sound like "steef".

The various embodiment of the invention below provide improvements for fixing mistakes in the TTS voice database of phonemes. These improvements will enable researchers to reduce the error rate down to an acceptable rate in a quicker and more efficient manner. This will reduce the time required to generate the voice, reduce the costs of the voice to the ultimate customer and enhance the acceptance and use of TTS voices in spoken dialog systems.

There are a number of different advantages to the innovations surrounding the toolkit disclosed herein. This disclosure presents a series of screenshots that aid in describing the different embodiments of the invention and how they interrelate. Following the screenshots will be a series of flow diagrams illustrating example method embodiments of the invention. Each embodiment will relate to a different innovation in the process of perfecting to an acceptable error rate a TTS voice database of phonemes for use in synthesizing a TTS voice.

Figures 3A, 3B:
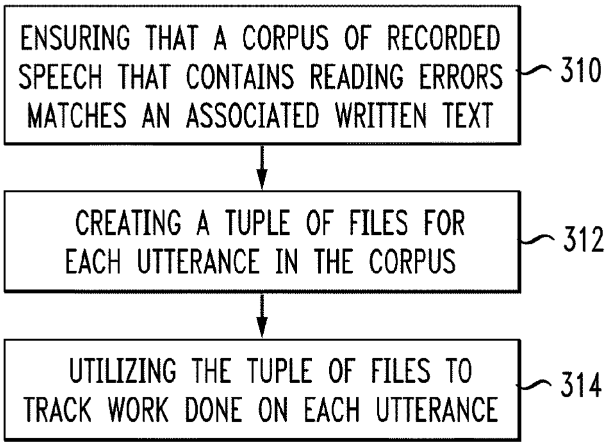
FIG. 3A illustrates an interface of the first embodiment of the invention.
FIG. 3B illustrates a method aspect of the first embodiment of the invention.

The first embodiment of the invention relates to a method for tracking the progress of tasks while generating the TTS voice. In typical cases, there are a number of researchers working on a voice and a number of tasks that need to be accomplished. It is difficult to track what each researcher is doing or has done for each voice. A problem can arise where work is either done twice or not done at all and more error can remain in the voice than is acceptable. Therefore, the first embodiment of the invention, shown in FIG. 3A, illustrates an interface for use in tracking the progress of generating a TTS voice. This is preferable done through an interface 300 such as a browser or other type of graphical user interface. It may be text-based as well. A particular voice talent or TTS voice is shown 302. A table 304 is provided to track the various steps that have been done for each TTS voice. Data in the table includes a worker, date, description of the progress, and status of the task. Other various pieces of data may be included as well. This data may be tracked for both a TTS voice in general or the context may be utterance by utterance. For example, teach utterance may have an associated table such that as researchers work through the generation process, they "check out" an utterance to act upon it.

FIG. 3B illustrates a method aspect of this embodiment of the invention. The method of tracking progress in developing a text-to-speech (TTS) voice comprises insuring that a corpus of recorded speech that contains reading errors matches an associated written text (310), creating a tuple of files for each utterance in the corpus (312) and utilizing the tuple of files to track work done on each utterance (314). This method involves the initial step of checking the corpus or recorded speech from the speech talent to insure that it matches the text. A corpus of recorded speech is segmented into utterances in a manner known to those of skill in the art. The corpus may comprise, for example, a set of paired audio and text files. The checking may be done dynamically while the voice talent is reading by a live person or by electronic means, or it may be done after the voice talent has read the sentences and after ASR is performed. There are various ways to match the recorded speech with the text being read. The method shown in FIG. 3B may be practiced as part of a toolkit used by developers of a TTS voice. The toolkit may be a standalone product or available over the Internet or other network, wired or wireless.

A tuple may be defined as a finite sequence of objects. Tuples come in lengths: single, pairs, triplets, quadruples, quint-tuples, sextuples, septuplets, octuples, etc. For example, a tuple in a cartesian 2D system using only positive integers up to 3, would yield pairs, (x,y) specifying the intersections. The total set of possible tuples in this example would be $\{(1,1),(1,2),(1,3),(2,1),(2,2),(2,3),(3,1),(3,2),(3,3)\}$. Each tuple in the context of the present invention contains data, such as, for example, ASR-generated phonemes, pronunciation lists, confidence scores, and a progress matrix that keeps track of what has been done to each tuple and by whom.

As shown in FIG. 3A, where the tuples are tracking work on an utterance by utterance basis, a research can "check out" an utterance, see what has been done, and see what is the next task to be performed. The worker can then perform that task and return the utterance back to the database wherein the tuple automatically updates its progress so that the next researcher will not duplicate that work. The progress matrix stores information about which person has performed work on the tuple. In this manner, when different people perform work on each tuple, work-tracking information is stored in the progress matrix such that several people may simultaneously work on the corpus.

If there are numerous TTS voice being developed, a researcher could check out a TTS voice, and then within that context check out an utterance of that voice for work. Therefore, there may be a hierarchy of tuples for managing various voices and all the work on individual utterances that needs to occur.

There are various ways in which the interface may be presented in order for workers to easily check out tasks to do. For example, a worker may select a TTS voice and have presented simply with the "next task" to be done. This may be the next sentence that needs to be reviewed or the next TTS test to be performed. Then the worker may be able to "check out" that task for processing. The next worker that would inquire regarding that TTS voice would then be presented with the task after that "next task" to be done, and so forth. As can be appreciated, the toolkit that manages for the researchers the handling of the many tasks that need to be done on each utterance in a large database markedly increases the efficiency of the process.

Figure 4A:
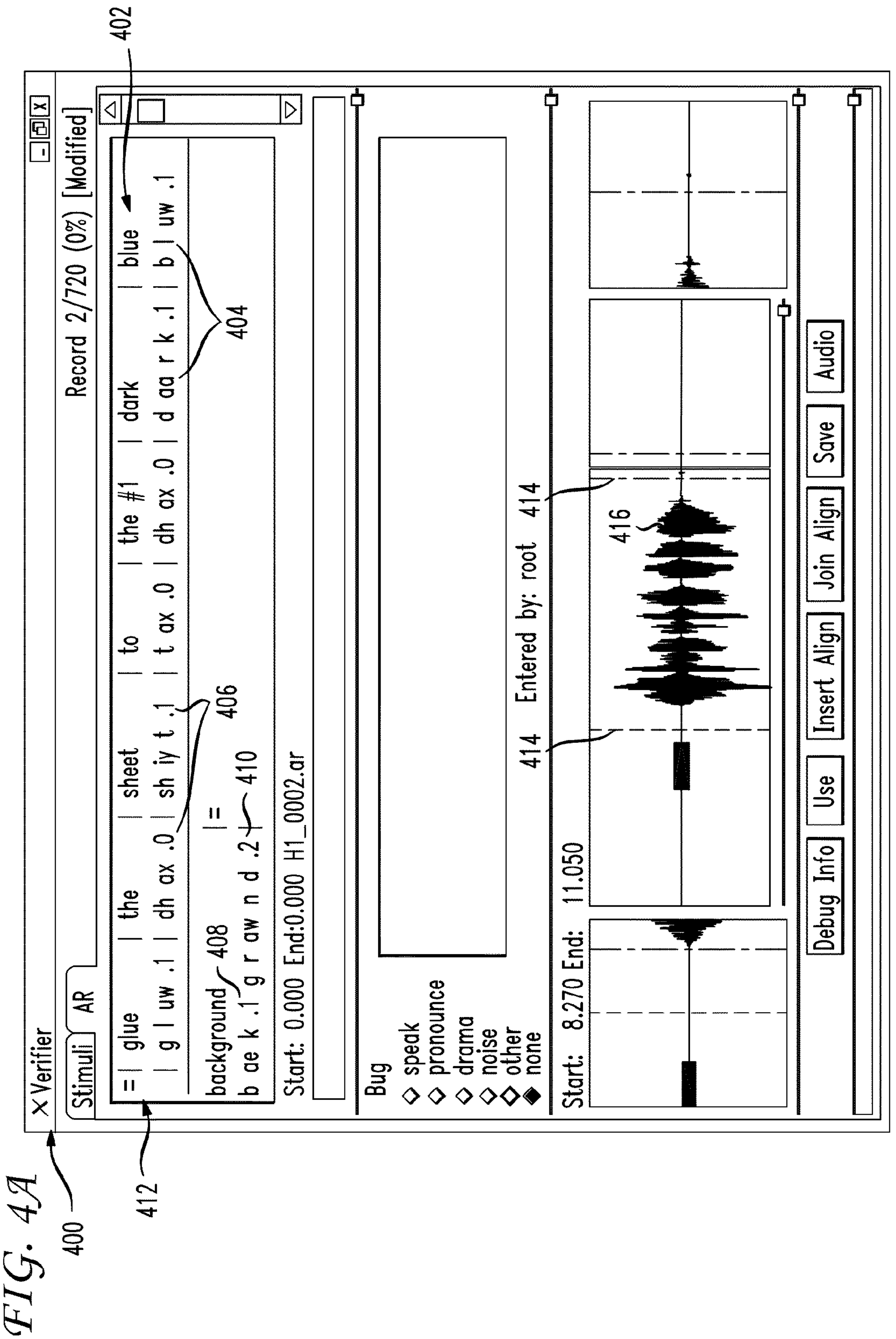
FIG. 4A illustrates an interface for the second embodiment of the invention.

The second embodiment of the invention relates to a system and method for finding errors in the database when generating a TTS voice. FIG. 4A illustrates a graphical user interface 400 that is used for analysis in developing the TTS voice. This window shows an exemplary "verifier" operation. As introduced above, after the voice talent reads the sentences a first pass ASR process occurs. The ASR generates the ASR results with word 402 (this is the orthography, or the word that was recognized), phonemes chosen by ASR 404 as well as other information such as an indication of stress 406 for each word. There may be primary stress 408 and/or secondary stress 410 identified within a word. The window 412 provides this information enables the worker to view the results of the ASR. The worker can utilize this graphical interface 400 to check for errors in the database. For example, the user may provide input to select a word or a phoneme and listen to the associated audio. A graphical representation of the audio is also shown 416. This may be used to adjust the endpoints 414 as discussed above. The user can click and select phonemes or words and listen to the phoneme or word.

In addition, this user interface 400 may enable the system to present to the user a color-coding of each phoneme or word according to a confidence score. The word-based confidence score may be based on a composition of the color-coding associated with each phoneme associated with each word. The system may, in this regard, only show sentences, phonemes or words to the worker that are below a certain confidence score such that only the most egregious ASR results are presented for correction.

In one aspect of this embodiment, the worker selects a word or a phoneme from the interface and the system presents a text transcription and corresponding audio to the worker to enable it to be checked for errors. A list of transcriptions may be presented as well for the selected word or phoneme. The spectrogram 416 provides further information about the characteristics of the audio. By receiving an indication of an ASR mistake from the worker, the system can correct speaker dependent entries associated with the mistake and rerun ASR on all utterances containing the word or phoneme associated with the mistake. This reduces the number of sentences or words that the worker needs to check.

Figure 4B:
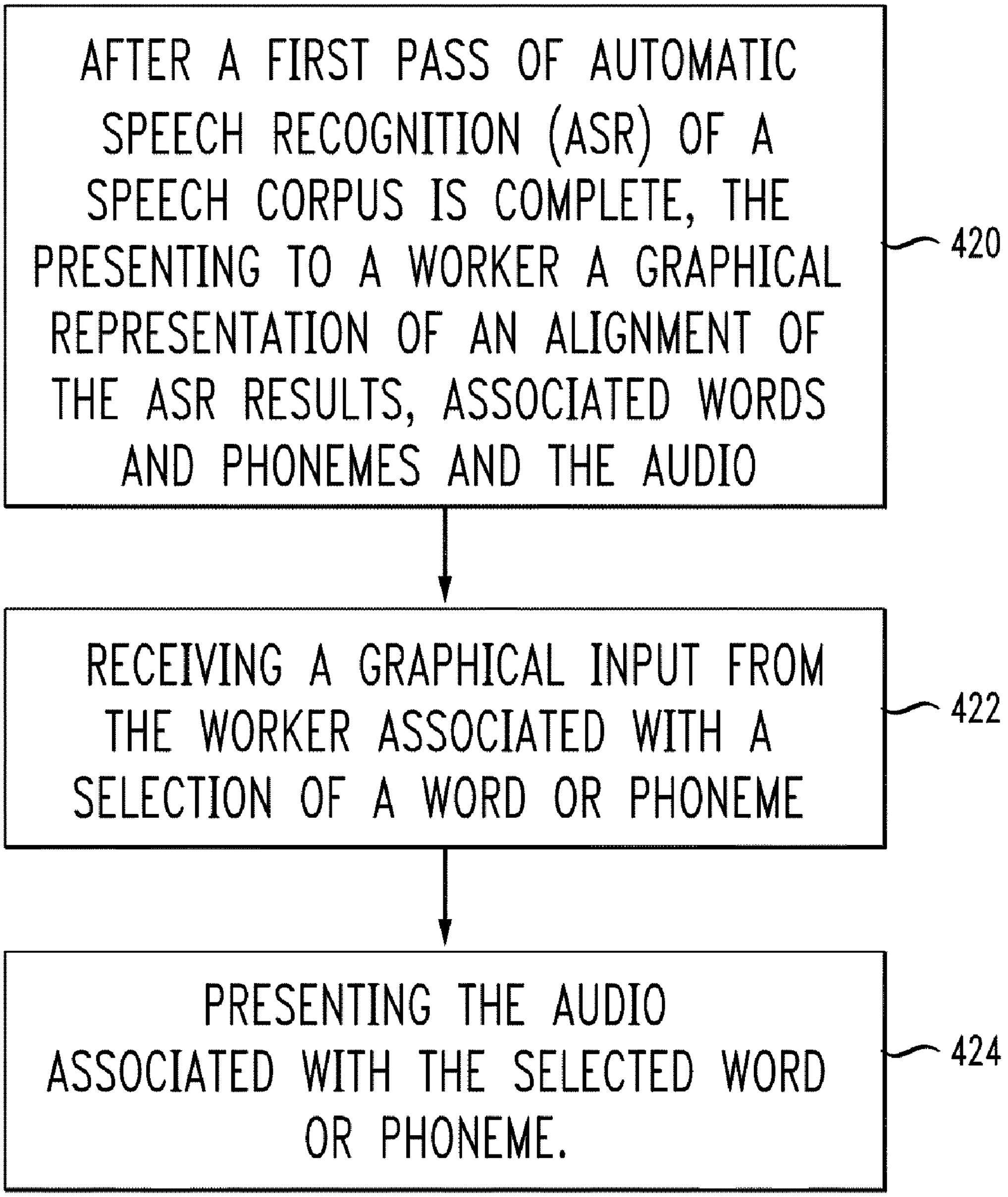
FIG. 4B illustrates a corresponding method associated with the second embodiment of the invention.

FIG. 4B illustrates the method aspect of this second embodiment. The method of enabling human workers to find errors when developing a text-to-speech (TTS) voice comprises presenting a graphical user interface wherein after a first pass of automatic speech recognition (ASR) of a speech corpus is complete, the interface presents to a worker a graphical representation of an alignment of the ASR results, associated words and phonemes and the audio (420), receiving a graphical input from the worker associated with a selection of a word or phoneme (422) and presenting the audio associated with the selected word or phoneme (424).

The third embodiment of the invention relates to testing the TTS voice by workers after the database has been prepared. Once a TTS voice has been completed and is ready for testing, humans must listen to TTS synthesis to make sure there are no mislabeled or misaligned phonetic units. Random listening is expensive and there is no guarantee of good coverage. The following technique uses a greedy algorithm to synthesize millions of words of text, but then to present the smallest possible subset which contains at least N instances of every unit to a human for listening tests. In this way, the system can reduce the required listening by an order of magnitude or more and guarantee coverage of every phonetic unit. This method guarantees that all mislabeled units will be found and all examples of gross misalignment will be found.

The process where this embodiment is applicable is the stage where the TTS voice is ready for testing and any final fixing or comments. In this scenario, the TTS voice may consist of 500,000 phoneme units or half units. In practical use, about 20-30% of that database rarely if ever will get used in synthesizing the TTS voice. Improvements can be made to identify which phoneme units never or rarely get used and then only test the others. In this regard, this embodiment of the invention involves synthesizing millions and perhaps billions of words. The system will track each instance of each unit (i.e., phoneme or half-phoneme or other unit) that gets used in the synthesis process. The system keeps lists of the phonemes used to synthesize the millions of words, phrases and sentences. After a certain threshold of testing, it is determined that all the units that will be "exercised" or "tickled" during synthesis have been exercised. In other words, after doing this process, those approximately 70% of phonemes that are the ones used in the vast majority of synthesis will be identified. All units may be exercised in this process. Also out of that process the system can identify the smallest set of coherent English (or whatever language) words and phrases that exercises each unit in the database. The end result is that the set of TTS synthesis that a worker will actually have to listen to is reduced a great amount that can be listened to in a short amount of time. Otherwise, the listening requirement is much larger to exercise the entire database.

Figure 5A:
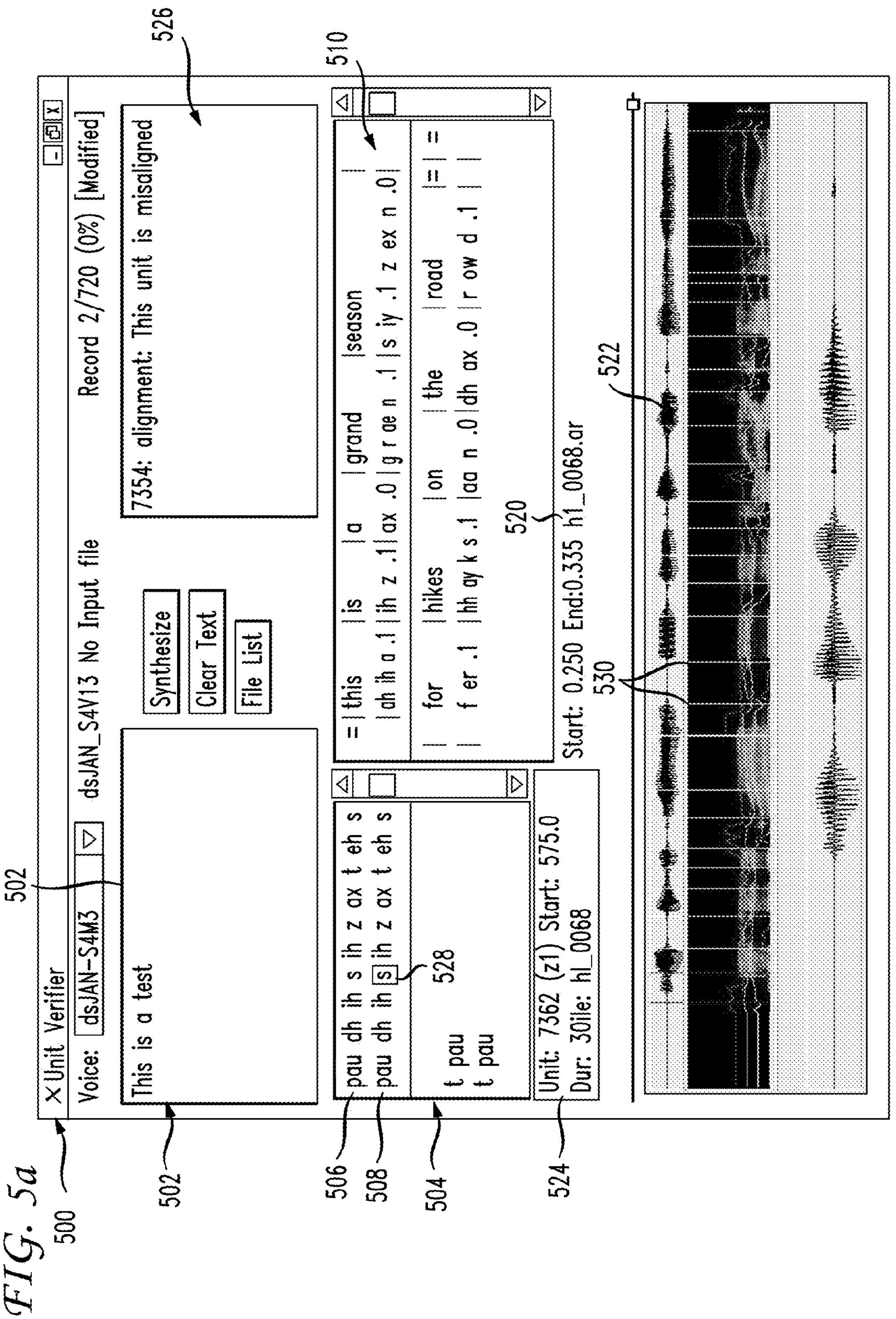
FIG. 5A illustrates an interface associated with the third embodiment of the invention.

FIG. 5A illustrates a user interface 500 for testing the TTS voice database. Words are entered into a field 502 which are the words sent to the TTS for synthesis. This interface may be termed a unit verifier. The words may be sentences placed in from the reduced shortened list of sentences that exercise the majority of the database. Rows of phonemes are shown in field 504. These are the phonemic output of the TTS system. Preferably, the database uses ½ phonemes and in this example, the top row 506 is the first ½ phoneme the bottom row 508 is the second ½ phoneme. For example, the first row 506, first ½ phoneme "pau" and the second row 508 "pau" ½ phoneme below it represent the entire "pau" phoneme. These two phonemes may be taken from the same sentence in the database or may be drawn from different sentences or utterances in the database. Colors may be used in this interface to show that different ½ phonemes came from different places. For example, color coding can be used to match ½ phonemes from various database units. Clicking on the phoneme, say "s" 528, brings up the original sentence that it was taken from in window 510 and produced the waveform or spectrogram window 522 that matches the input sentence from the database. In this analysis the phonemes may be full phonemes, half phonemes, ⅓ phonemes or any other divisional that is workable. The system can also present the unit number of the database, the duration, name of the source file recorded from, and the starting offset in the file.

Figure 5B:
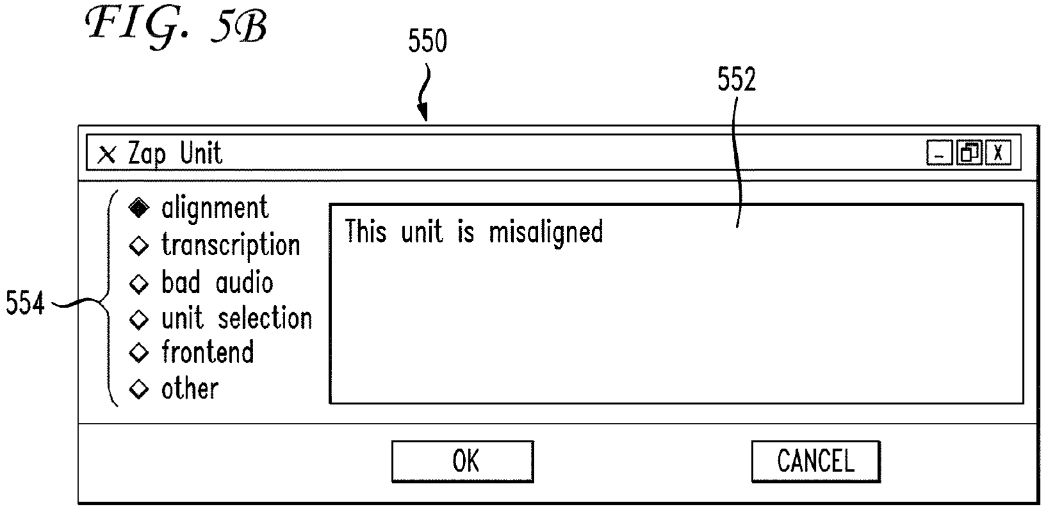
FIG. 5B illustrates another interface of the third embodiment of the invention.

Field 510 shows the words, phonemes, stress numbers, and alignment. This interface enables a user to click on a phoneme and "zap" it, remove it and others like it from the database, and make comments, as well as other actions. For example, if a particular phoneme sounded erroneous, the worker could click on it or highlight it in some fashion and a screen similar to that in FIG. 5B could appear with options 554, such as alignment, transcription, bad audio, unit selection, frontend or other may be selected 554 and comments in a field 552 could be provided for later analysis. In this manner, the worker can select the unit or phoneme and clean up the database.

Figure 5C:
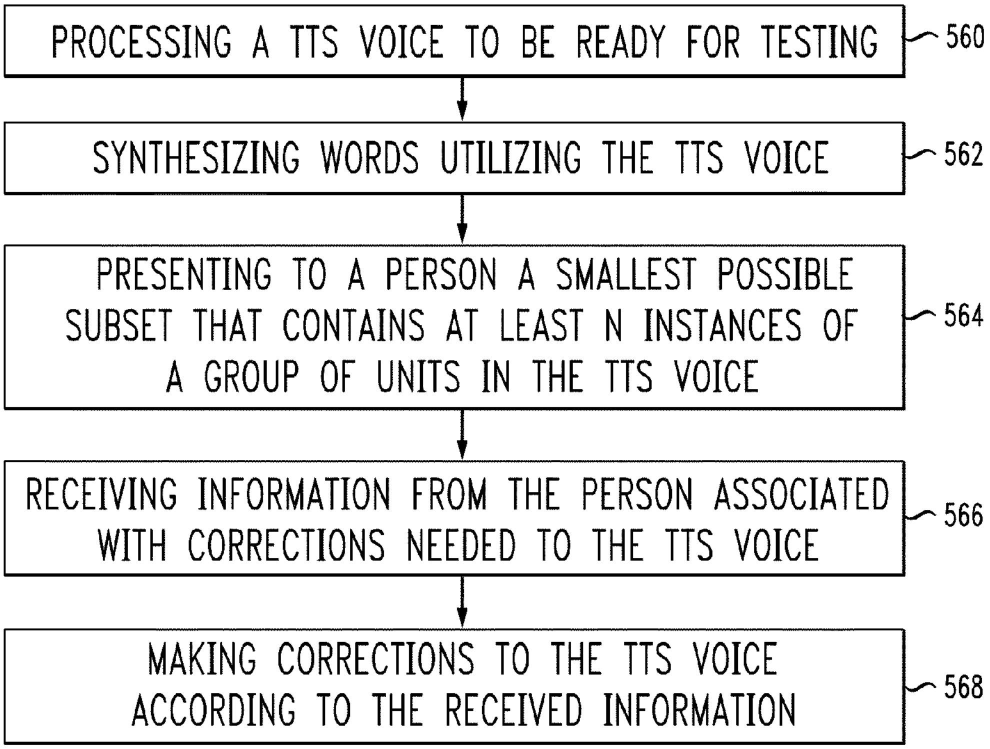
FIG. 5C illustrates a method aspect of the third embodiment of the invention.

FIG. 5C illustrates an example method embodiment of the invention. A method for preparing a text-to-speech (TTS) voice for testing and verification comprises processing a TTS voice to be ready for testing (560), synthesizing words utilizing the TTS voice (562), presenting to a person a smallest possible subset that contains at least N instances of a group of units in the TTS voice (564) and receiving information from the person associated with corrections needed to the TTS voice (566) and making corrections to the TTS voice according to the received information (568).

The group of units may be all the units in the TTS voice or may comprise the group that is identified as the most likely to a certain degree to be drawn upon for synthesis. For example, this group may comprise 70-80% of the units that were exercised most by the synthesized sentence set (millions of words). The number N may be 1 or more. Through this process, in a shorted amount of listening time for the worker, all mislabeled units may be found and all examples of gross misalignment may be found in the TTS voice.

The fourth embodiment of the invention relates to preparing a pronunciation dictionary for improving the ASR process in building the TTS voice. Lexicons are used for automatic speech recognition. Lexicons are repositories for words. They store pronunciations of words in such a way that they can be used to analyze the audio input from a speaker and identify the associated words or "recognize" the words.

Often researchers will start with dictionaries for TTS and ASR. One such dictionary is the Carnegie Mellon University (CMU) pronunciation dictionary which is a machine-readable pronunciation dictionary for North American English that contains over 125,000 words and their transcriptions. This format is particularly useful for speech recognition and synthesis, as it has mappings from words to their pronunciations in the given phoneme set. For example, the dictionary phoneme set contains 39 phonemes, for which the vowels may carry lexical stress such as no stress (0), primary stress (1) and secondary stress (2).

Often the readings of the voice talent or words you want to synthesize in TTS are not found in the CMU dictionary or other dictionary used. One approach is to "bootstrap" the dictionary by using TTS. Workers can feed words into the TTS system that are not in the dictionary and the TTS synthesizer will do its best to say those words. This is a process of creating a new pronunciation dictionary. The TTS system will present phonemes to use for the words if the words are not in the dictionary. When the workers then do alignments, however, cross word affects can happen. For example, if a person says "hit him" in the context of "hitdum", context rules exist and are understood for such variations. Researchers can then look for these cross-word contexts where phonetic changes across word boundaries occur. You tell the system that the person may say "hit him" or "hitdum". The ASR then would decide what the person said. The researchers then utilize these rules specific to the actual input from the voice talent using the known linguistic rules to make an improvement over the previous ASR accuracy.

There are also ways to tailor the pronunciation dictionary for a dialect or a region. If the system just has the dictionary entries, often people will deviate from that in connected speech. For example, if someone is from the north part of the United States may say hello by simply saying "Hi". A person from the south may say "Ha" for hello. If the voice talent is from south, researchers can modify dictionary by known dialect rules or made up rules to change a particular set of words, such as "greasy" to "greezy". These new entries are added automatically using a TTS letter-to-phoneme rules.

Furthermore, many speakers have idiosyncrasies such as pronouncing "ask" as "aks". Researchers can built a set of common words different from one form of pronunciation which can also provide improvement in recognition accuracy. These common words or changes to the dictionary may only apply to the speaker or globally. For example, the variance in the pronunciations may be supplemented with speaker dependent variations with additional context rules on top of that to improve the ASR for that speaker.

Figure 6A:
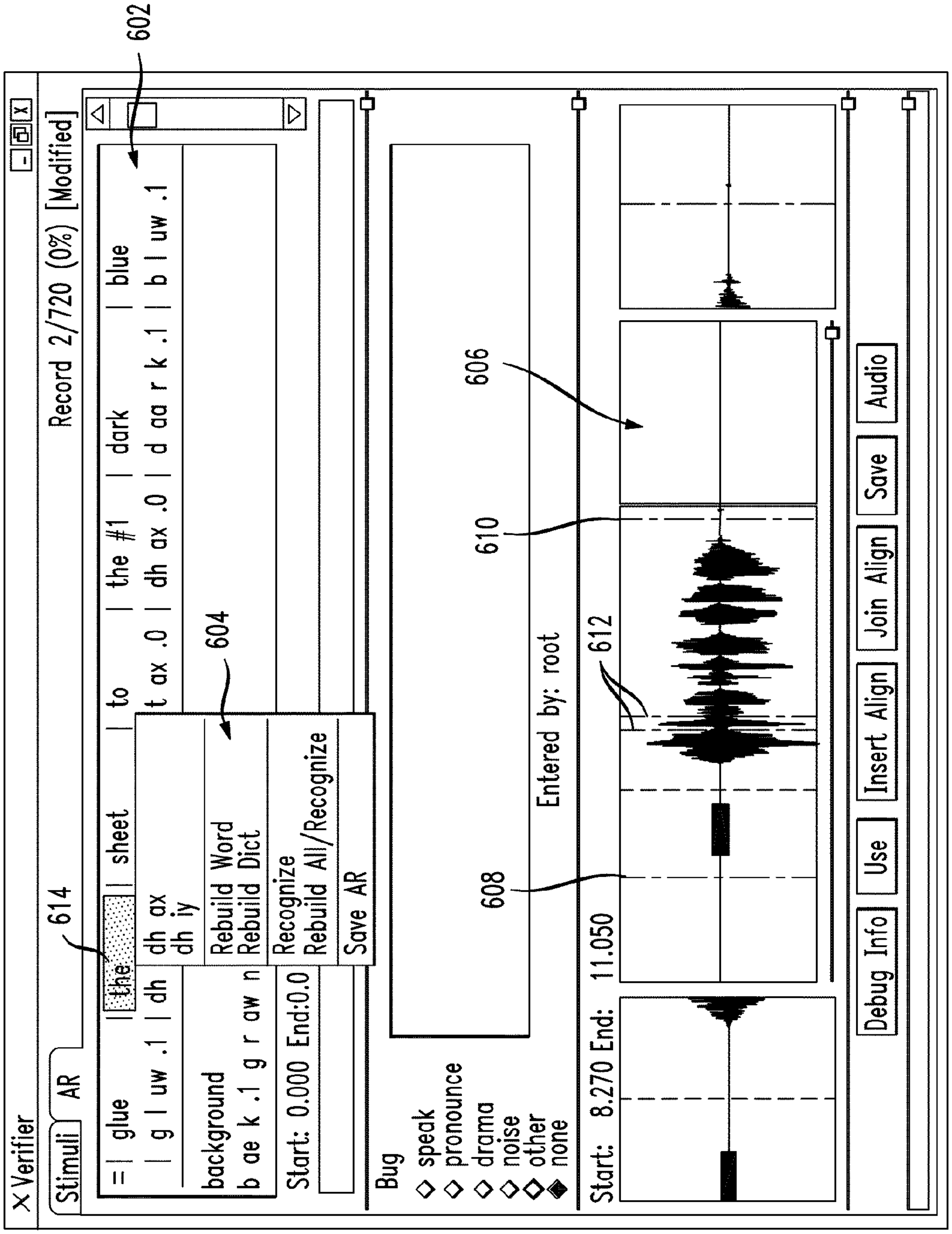
FIG. 6A illustrates an interface associated with the fourth embodiment of the invention.

FIG. 6A illustrates a graphical interface 600 for use in generating the dictionary or other database for improving the ASR and thus ultimately the TTS voice. Where no dictionary is used to begin the process, TTS can be used to create a dictionary. TTS will generate a pronunciation for each word, but it is not perfect. Therefore, they are checked for correct pronunciations. Where the ASR makes a mistake, this interface enables the words to bring up a list of possible variants 604 for adding a new variant and running ASR again to fix the problem.

The Dictionary can be implemented as a database with 1 or more global variants on pronunciations. Then there may be speaker variations and regional variants. "The" or "da" may be a speaker dependent variant. As researchers would listen to the speech recognition output from the voice talent, they may discover these speaker dependent variants. FIG. 6A illustrates the sentence "glue the sheet to the dark blue background" in window 602. The phonemes and stresses are shown for each word. A spectral graph 606 is shown for the sentence with end points 608 and 610. The first occurrence of the word "the" is highlighted 614 as selected by the researcher. As an example, if the particular voice talent said "da bears" and ASR recognized the "da" as the person saying "the", the researcher may desire to indicate that this recognition was wrong for this particular speaker. FIG. 6A shows that the researcher can select a word 614 and a pop up window 604 will present information about this word and speaker, including the context, variations on pronunciation, and other actions such as rebuilding the word, rebuild the dictionary, recognize the word and rebuild all and save. At this point, the researcher may want to add the pronunciation "da" as a variant for ASR. This variant can then be checked to apply to just this speaker or globally.

After such a change is made, the researcher can use this tool to re-run the recognizer on all sentences that have "the" in it and recompile those sentences, the researcher could compile only sentences that are out of date, or recompile only this current sentence. Thus, the tool enables the researcher to make tailored changes according to whether the change should be applied only for a word, sentence, speaker, globally, and so forth. As an example of where a change may only be made in one sentence may be where a word such as "catmandu" is pronounced differently by this speaker as "cutemando". The researcher may desire to only recompile the single sentence on the fly and not globally apply this variant. In this manner, the pronunciation dictionary can account for the reading errors and idiosyncrasies of the voice talent or other speakers.

By making these changes, the tool enables the researcher to force the ASR module to choose from a specific subset of one or more variants of a word when more than one pronunciation exists for the given word. Once that change is made, the system can automatically generate the phonetic variant pronunciations for the pronunciation dictionary for any given word. With the known linguistic and contextual rules, generating the phonetic variant pronunciations can be based on the surrounding linguistic context for any given word. The surrounding contexts may be associated with any language or any foreign language.

The pronunciation variants may be added by the researcher as set forth above or may be automatically generated. Inasmuch as the variants that show up in window 604 may be automatically generated, this can be tracked such that any automatically generated lexical pronunciations can be flagged for human inspection. Manually generated lexical pronunciations may also be tracked such that a second researcher can double check the decisions. A module called a "voice builder" may be used to add the correct pronunciation into the lexicon that may also tag the addition as being restricted to the particular voice talent. By making the pronunciations speaker dependent, subsequent voices will require human inspection as well ensuring that the lexicon is not over-generalized. Letter-to-sound rules may be utilized to further add default pronunciations to the pronunciation dictionary. These are rules that predict how a given world will be pronounced. These rules are applied to words that are not in the dictionary such as proper names.

The worker can also manually adjust the start and stop times if necessary for phonemes using the waveform 606 and boundaries 608, 612 and 610. This can enable that a phoneme is correctly time-aligned in the speech database.

Figure 6B:
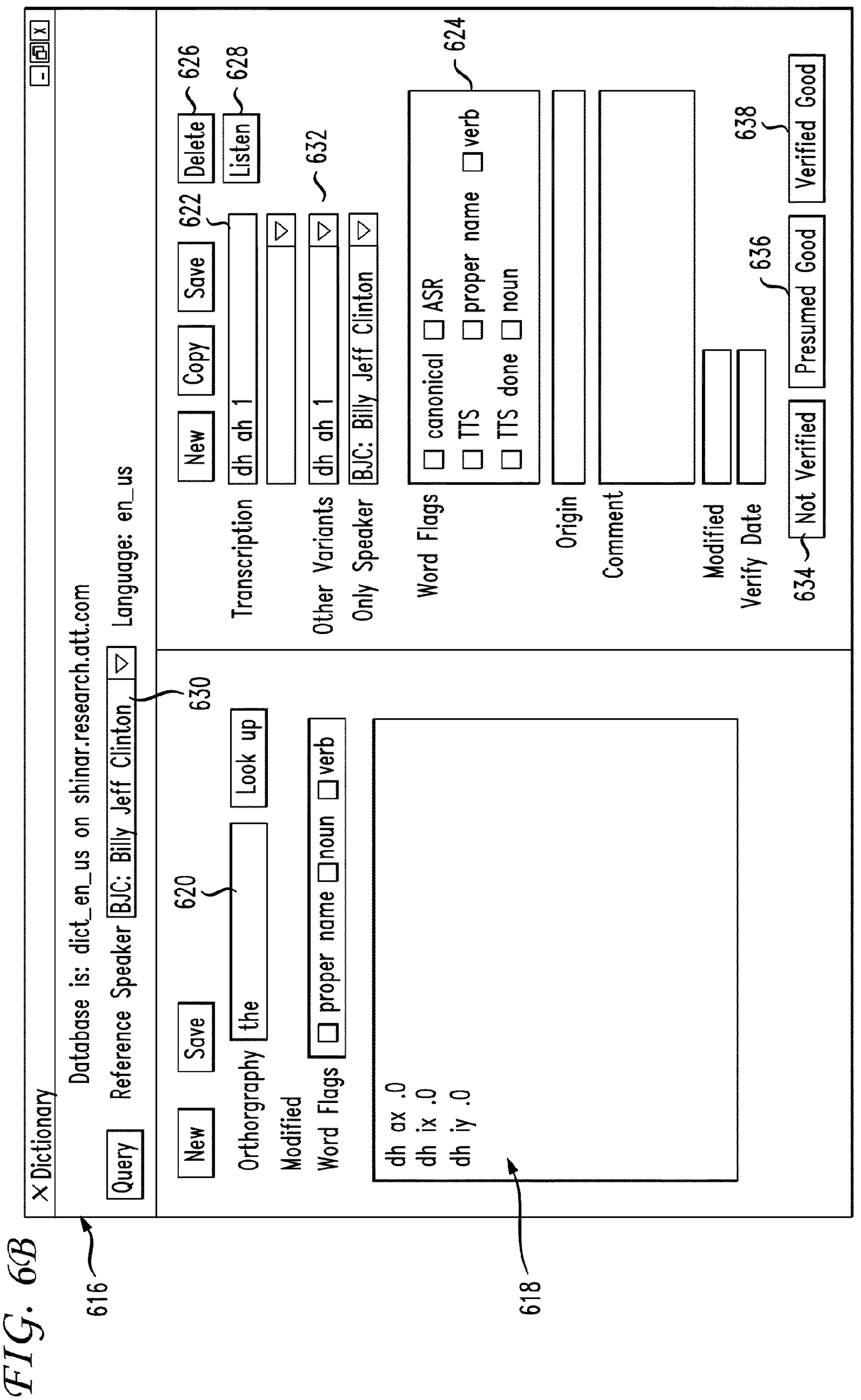
FIG. 6B illustrates another interface associated with the fourth embodiment of the invention.

FIG. 6B illustrates an example user interface 616 that shows options for manipulating and working with the dictionary. This is part of the database entry toolkit for alternative pronunciations as input to the ASR module. A word, "the" in this case, is entered into the interface in a field 620 and variants are shown 618. Here, a person may have a unique or special pronunciation of the word "the". Various features of the toolkit are shown: the selection of the reference speaker 630, a transcription of the word with stress indication 622, options for other variants 632, options for word flags 624, the opportunity to delete the word 626 or listen to the associated audio 628. Further, the toolkit enables the researcher to indicate that the word was not verified 624, presumed good 636 or verified as good 638. Other features as well are shown in this interface. As can be seen, the toolkit of the present invention enables the researcher to more efficiently work with and modify the dictionary used for generating a TTS voice. The modification is done by the worker clicking on the misrecognized word, adding a new variant and then rerunning the recognition.

In another aspect of this embodiment of the invention, the researcher may tell the recognizer that there is only one possibility for recognizing a word. In this regard, the researcher can remove variants for a word and perhaps the context of the word. For example, in FIG. 4A, the researcher could force the recognizer that the only possibility for recognition of the first time "the" is used in window 412 is to recognize "da", and the second use of the word "the" should be recognized as "the." Therefore, the ASR module may be given different pronunciation lists for each occurrence of a word in a sentence. Context sensitive restraints are automatically generated. This automatically constrains ASR to only consider contextually valid pronunciation variants.

In English, for example, the word final /t/ in "hit" can only be flapped if the following word begins with an unstressed vowel. So in those cases where "hit" is followed by a word beginning with an unstressed vowel, the flap variant of /t/ is automatically generated, otherwise it is not. In a language like French, which allows for liaison, a similar rule applies, so the a /z/ in "parlez" is only allowed as a possible variant if the following word begins with a vowel, otherwise /z/ is not allowed and it will not be presented to ASR ("parlez-en" vs "parlez-vous"). Using context rules significantly improves ASR accuracy. As ASR proceeds, an alignment file is created with the original word and the phonemes and offsets produced by the ASR recognition engine. The color and intensity for display of each phoneme and phonetic word is determined by an ASR confidence metric. This allows voice builders to visually inspect ASR output and selectively check suspicious results. This approach can be used to make corrections where the recognizer did not properly recognizer the word or if one wants to force a certain interpretation on the result.

Figure 6C:
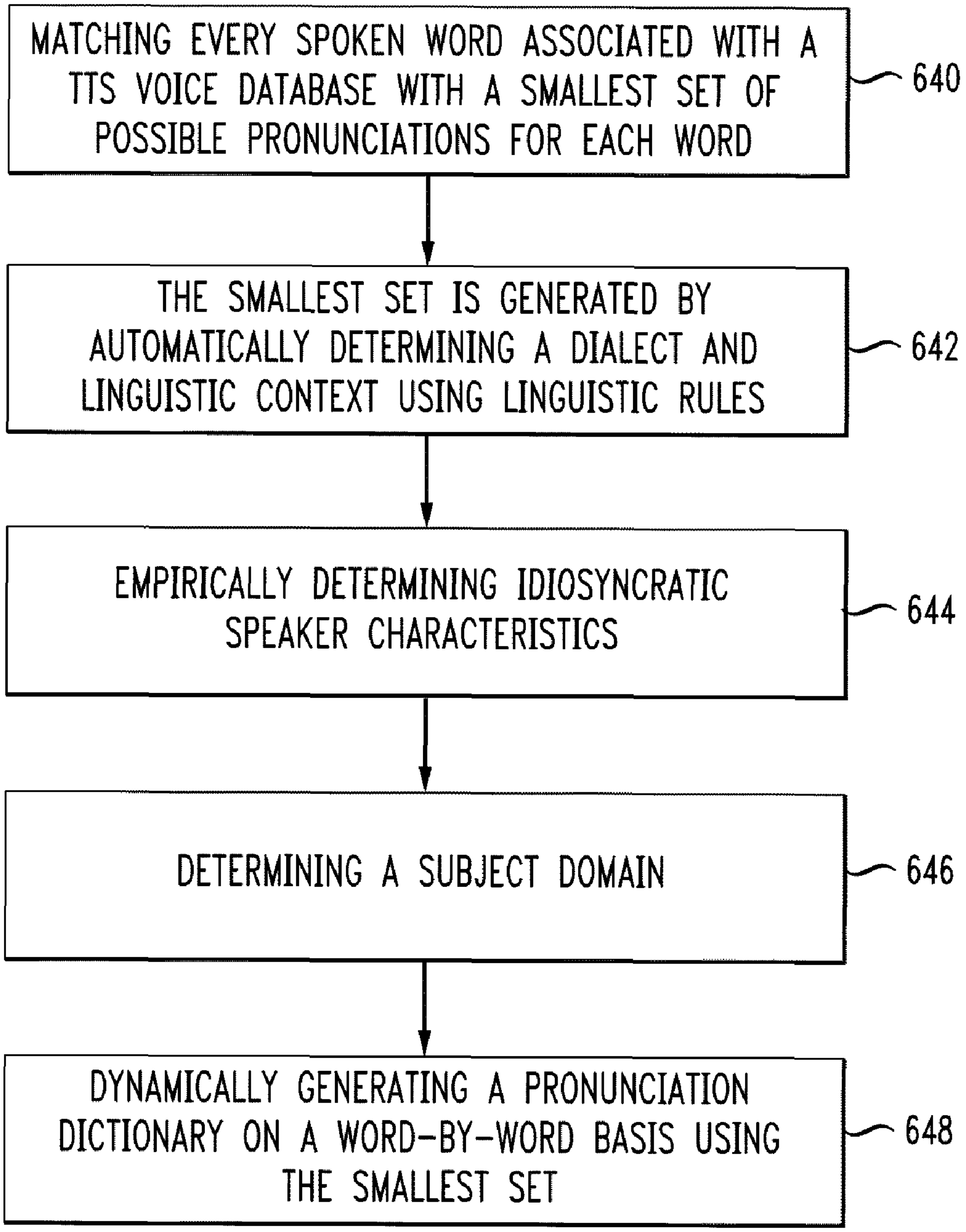
FIG. 6C illustrates a method aspect of the fourth embodiment of the invention.

FIG. 6C illustrates a method aspect of this embodiment of the invention. The method of generating a database for a TTS voice comprises matching every spoken word associated with a TTS voice database with a smallest set of possible pronunciations for each word (640). The smallest set is generated by automatically determining a dialect and linguistic context using linguistic rules (642), empirically determining idiosyncratic speaker characteristics (644) and determining a subject domain (646). Finally, the method comprises dynamically generating a pronunciation dictionary on a word-by-word basis using the smallest set (648).

Coloring phonemes may also be useful in terms of confidence scores or other parameters in ASR and TTS processing. For example, the toolkit may be programmed to highlight suspicious recognition and color code them (such as red, yellow, orange) based on confidence score of the recognizer. This may be able to reduce the amount of manual correction the researcher would need for processing.

Figure 7:
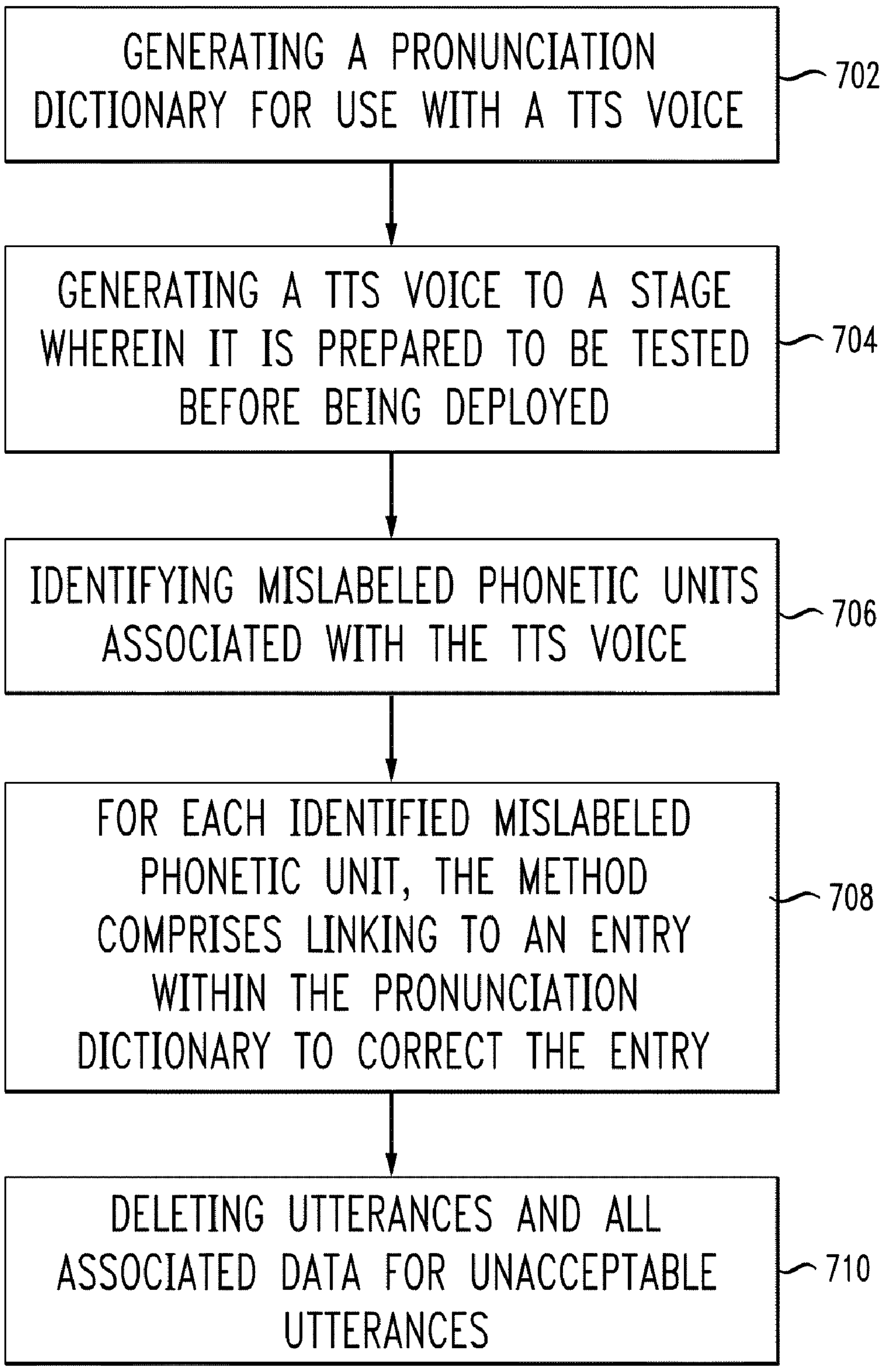
FIG. 7 illustrates a method aspect of the fifth embodiment of the invention.

The fifth embodiment of the invention relates to repairing the database during and after testing. FIG. 7 illustrates the method aspect of the invention. A method of correcting a database associated with the development of a text-to-speech (TTS) voice comprises generating a pronunciation dictionary for use with a TTS voice (702), generating a TTS voice to a stage wherein it is prepared to be tested before being deployed (704) and identifying mislabeled phonetic units associated with the TTS voice (706). For each identified mislabeled phonetic unit, the method comprises linking to an entry within the pronunciation dictionary to correct the entry (708) and deleting utterances and all associated data for unacceptable utterances (710).

As an example, the data associated with the unacceptable utterance may be at least one of text, audio and labels. This process of deleting the associated data and utterances may be able to occur automatically via a one-click operation in the toolkit. Another type of utterance and associated data that may be deleted are those that cannot be successfully aligned by automatic speech recognition (ASR).

Another aspect of this embodiment of the invention comprises correcting speaker dependent entries in the pronunciation database and rerunning ASR on all utterances containing the offending word. In this regard, the toolkit enables the researcher to make corrections that are speaker dependent and then re-run the ASR only on those utterances containing the offending word. This streamlines the process to quickly make corrections without needing to re-run the entire database. A voice-builder module may automatically review only utterances that contain the offending word as well.

FIG. 5A may be used for this process. This illustrates the spectrogram 522 of an utterance and the phonemes 506, 508 generated by the ASR module. The TTS system can synthesize the input words in window 502. The researcher may be able to tell from the spectrogram where features such as letters like "s" and vowels have certain signatures, such as a certain sign of friction in the letter "s". The researcher can quickly tell if there is a misalignment and flag a word, phoneme, or utterance. Once a repair is done on a sentence, the researcher can re-run recognition on it to insure correct ASR. In some cases, the ASR continues to get it wrong. From this window as well the researcher can "zap" such an offending word, utterance or phoneme.

FIG. 5A also illustrates the interface after a bad unit has been "zapped". Zapped units may be highlighted in a color indicating their status and preferably in pane 510. From this vantage point, a researcher can easily identify which units have been zapped so that they don't need to be zapped again.

In sum, the various features of the inventions above all combine to provide a system of software and methods for organizing and optimizing the creation of correctly labeled databases of half-phonemes suitable for use by TTS synthesizers that use unit selection. Many innovations are part of the system for generating the TTS voice: A method to match every spoken word with the smallest set of possible pronunciations for that word. This set is determined by dialect, idiosyncratic speaker characteristics, subject domain, and the linguistic context of the word (what words come before and after it). The dialect and linguistic context are determined automatically using linguistic rules. The idiosyncratic speaker characteristics are determined empirically; A method for generating a minimal set of test data that exercises every phonetic unit in the database. Using this method reduces the required amount of listening by an order of magnitude, so speeds up the testing and verification phase by a large amount; A graphical user interface whereby after the first pass of ASR is complete, the audio and phonemes are lined up and correlated with the audio. The user can click on a word or a phoneme and hear the corresponding audio. A skilled user can find ASR errors simply by listening to the audio and looking at the transcription; A method by which the ASR engine color-codes each phoneme based on the confidence level. Words are also color-coded based on the composition of each phoneme's color. This enables the software to facilitate spot-checking of ASR accuracy merely by clicking on those words or phonemes where ASR confidence scores are beneath some threshold; A method by which all words with confidence below a configurable threshold are presented along with associated audio. A list is of transcriptions is visually presented, and the corresponding audio is played; A method for dynamically correcting the pronunciation dictionary on a word-by-word basis. This method accounts for reading errors, or idiosyncrasies by the voice talent; A method for forcing the ASR to choose from a subset of one or more variants of a word when there are more than one pronunciation variants for a given word; A method for defining linguistic contexts which automatically generate phonetic variant pronunciations for any given word, based on the surrounding linguistic context; A method for defining linguistic contexts for any foreign language, so the same techniques can be used for any language; A method for repairing mislabeled phonetic units that are discovered during testing by linking the unit back to the errant dictionary entry; A method for automatically deleting utterances and all associated data (text, audio, labels) for those utterances that cannot be successfully aligned by ASR or which are unacceptable for other reasons; A method for encoding work-tracking information into each utterance. This method allows several workers to work simultaneously on the same data set without duplicating work; A method for tracking where every possible lexical pronunciation comes from either machine generated or human entered; A method for automatically adding default pronunciations to the lexicon for new words, based on TTS letter to sound rules; A method for flagging automatically generated lexical items for human inspection; A method for automatically verifying every instance of difficult-to-recognize words by finding all instances of the word in the corpus and presenting a visual representation of the word, it's transcription, and a link to its audio; A method for automatically browsing through the entire corpus using single character controls.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. A tangible computer-readable storage media explicitly excludes a wired or wireless connection, signals per se and forms of energy. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method for preparing a text-to-speech (TTS) voice via a computing device, the method comprising:

synthesizing words utilizing a preprocessed TTS voice;

presenting to a person a subset of word variants that contains at least N instances of a group of units in the TTS voice;

receiving information from the person associated with a correction needed to the TTS voice; and making the correction with the computing device to the TTS voice according to the received information, wherein each phonetic unit in the TTS voice is exercised.

2. The method of claim 1, wherein synthesizing words further comprises synthesizing at least one million words.

3. The method of claim 1, wherein N equals 1.

4. The method of claim 1, wherein N equals more than 1.

5. The method of claim 1, wherein all mislabeled units are found and all examples of gross misalignment are found in the TTS voice.

6. A computing device for preparing a text-to-speech (TTS) voice, the computing device comprising:

a processor;

a first module controlling the processor to synthesize words utilizing a preprocessed TTS voice;

a second module controlling the processor to present to a person a subset of word variants that contains at least N instances of a group of units in the TTS voice;

a third module controlling the processor to receive information from the person associated with a correction needed to the TTS voice; and a fourth module controlling the processor to make the correction with the computing device to the TTS voice according to the received information, wherein each phonetic unit in the TTS voice is exercised.

7. The computing device of claim 6, wherein synthesizing words further comprises synthesizing at least one million words.

8. The computing device of claim 6, wherein N equals 1.

9. The computing device of claim 6, wherein N equals more than 1.

10. The computing device of claim 6, wherein all mislabeled units are found and all examples of gross misalignment are found in the TTS voice.

11. A system for synthesizing speech, the system comprising:

a processor;

a first module controlling the processor to receive text;

a second module controlling the processor to convert the received text to synthesized speech based on a text-to-speech (TTS) voice generated according to steps comprising:

(1) synthesizing words utilizing a preprocessed TTS voice, (2) presenting to a person a subset of word variants that contains at least N instances of a group of units in the TTS voice, (3) receiving information from the person associated with a correction needed to the TTS voice, and (4) making the correction with the computing device to the TTS voice according to the received information, wherein each phonetic unit in the TTS voice is exercised; and a third module controlling the processor to output the synthesized speech.

12. The system of claim 11, wherein synthesizing words further comprises synthesizing at least one million words.

13. The system of claim 11, wherein N equals 1.

14. The system of claim 11, wherein N equals more than 1.

15. The system of claim 11, wherein all mislabeled units are found and all examples of gross misalignment are found in the TTS voice.

* * * * *